United States Patent [19]

Cantineau

[11] Patent Number: 4,738,818
[45] Date of Patent: Apr. 19, 1988

[54] FEEDWATER CONTROL IN A PWR FOLLOWING REACTOR TRIP

[75] Inventor: Bertrand J. Cantineau, Braine L'Alleud, Belgium

[73] Assignee: Westinghouse Electric Corp., Pittsburgh, Pa.

[21] Appl. No.: 912,854

[22] Filed: Sep. 29, 1986

[51] Int. Cl.$^4$ .............................. G21C 7/32
[52] U.S. Cl. .................. 376/211; 376/216; 60/644.1; 60/667
[58] Field of Search ........... 376/211, 215, 216, 241, 376/378, 391, 402, 217; 60/644.1, 665, 667

[56] References Cited

U.S. PATENT DOCUMENTS

| | | | |
|---|---|---|---|
| 3,255,084 | 6/1966 | Doroszlai | 376/211 |
| 3,930,937 | 1/1976 | Torres | 376/217 |
| 4,104,117 | 8/1978 | Parziale et al. | 376/402 |
| 4,424,186 | 1/1984 | Cook | 376/211 |

OTHER PUBLICATIONS

Hocepied et al., "Automatic Control of the Water Level of Steam Generators from 0% to 100% of the Load", Nuclear Energy, vol. 17, No. 2, 1978, pp. 133-142.

Primary Examiner—Deborah L. Kyle
Assistant Examiner—Richard L. Klein
Attorney, Agent, or Firm—D. C. Abeles

[57] ABSTRACT

Excessive primary cooldown and start up of the auxiliary feedwater system in a pressurized water reactor (PWR) following a reactor trip are avoided by switching to primary coolant $T_{avg}$ programmed, main feedwater flow control in place of normal level programmed control. The Low $T_{avg}$ set point at which the main feedwater isolation valves are closed is lowered below the no load $T_{avg}$ temperature set point and the flow rate is decreased gradually to zero at a $T_{avg}$ between these two set points. In addition, the low-low level set point at which the auxiliary feedwater system is started is lowered if possible, and/or the level signal is filtered, or the start signal delayed, to increase the margin to the low-low set point.

16 Claims, 9 Drawing Sheets

PRIOR ART

PRIOR ART

FEEDWATER CONTROL IN A PWR FOLLOWING REACTOR TRIP

BACKGROUND OF THE INVENTION

1. Field of the Invention

This invention relates to control of the flow of feedwater to the steam generators in a pressurized water reactor (PWR) and in particular to a method and apparatus which avoids unnecessary actuation of the auxiliary feedwater system as a result of transients encountered following a reactor trip.

2. Prior Art

In a PWR nuclear power plant, reactor coolant, which absorbs the heat generated by fission reactions in the reactor core, is circulated through a steam generator to generate steam which drives a turbine-generator to produce electricity. Water for generating steam is provided by a main feedwater system which automatically maintains a programmed water level in the steam generator. Since it is essential that the heat generated by the reactor be removed, the main feedwater system is backed up by an auxiliary feedwater system which automatically takes over should the main system fail to maintain at least a minimum level. As opposed to the main feedwater system, the auxiliary system does not automatically regulate the flow of water to the steam generator to maintain the water level in accordance with a programmed schedule, since this system is a protection system with a minimum of control devices.

Under certain circumstances, a reactor trip can initiate a chain of events which leads to activation of the auxiliary feedwater system when there is nothing wrong with the main feedwater system. This is undesirable for four principal reasons. First, the water supplied by the auxiliary system is colder than that supplied by the main system and the PWR has a negative temperature moderator coefficient. This means that as the temperature of the reactor coolant is lowered and the coolant becomes more dense it slows down more neutrons to the thermal level required for fission, and hence the reactivity of the core increases. Thus, the cold feedwater in the steam generator can lower the reactor coolant temperature to the point where the shut down margin of the reactor becomes unacceptable. Secondly, the auxiliary feedwater system is an emergency system and should not be challenged unnecessarily. Thirdly, the excessive cooling imposes unnecessary thermal stresses on the equipment of the primary system. Fourthly, if the auxiliary feedwater system is badly controlled by the operator, the excessive cooling can result in the actuation of the safety injection system which is another emergency system which injects borated water into the primary circuit.

Accordingly, it is a primary object of the present invention to control the flow of main feedwater to the steam generators in a PWR following a reactor trip so as to avoid excessive primary cool down and unnecessary activation of the auxiliary feedwater system.

SUMMARY OF THE INVENTION

The present invention realizes this and other objects by maintaining main feedwater flow following a reactor trip, but at a rate which avoids excessive cool down of the primary coolant. More specifically, the main feedwater flow following a reactor trip is controlled as a programmed function of the primary coolant $T_{avg}$, which is the average temperature between coolant in the hot leg leaving the reactor and coolant returning through the cold leg, rather than as a function of steam generator level. The invention also involves lowering the $T_{avg}$ temperature, Low $T_{avg}$, at which the main feedwater system is isolated, to a temperature which is below the no load temperature. Under the temperature program, the flow is reduced with decreasing $T_{avg}$ until flow is terminated at a $T_{avg}$ which is above the Low $T_{avg}$ set point, but slightly below the no load $T_{avg}$. The program is selected such that feedwater flow is sufficient to prevent the steam dump from depleting steam generator inventory to the point where the low-low level is reached at which the auxiliary feedwater system is activated.

The invention also includes lowering the low-low set point if possible and further avoiding activation of the auxiliary feedwater system on the initial dip in level following a reactor trip resulting from temporary termination of steam flow until the dump system is operated, by delaying the level signal for a duration which permits the level to recover from the initial dip and/or by filtering the level signal to reduce the effect of the dip on the level signal.

Control of main feedwater flow as a function of primary coolant $T_{avg}$ is maintained while attempts are made to restart the reactor, and following a restart, until the steam generator level reaches its normal programmed value. Since integral control action is applied to the level programmed flow control signal, this signal is made to track the $T_{avg}$ programmed signal when the latter is active to avoid step changes in the control signal when transfering back to the level programmed control signal.

The present invention encompasses both apparatus and method for controlling feedwater flow to a PWR in the prescribed manner.

BRIEF DESCRIPTION OF THE DRAWINGS

A full understanding of the invention can be gained from the following description when read in conjunction with the accompanying drawings in which.

DESCRIPTION OF THE PREFERRED EMBODIMENT

Figure 1:
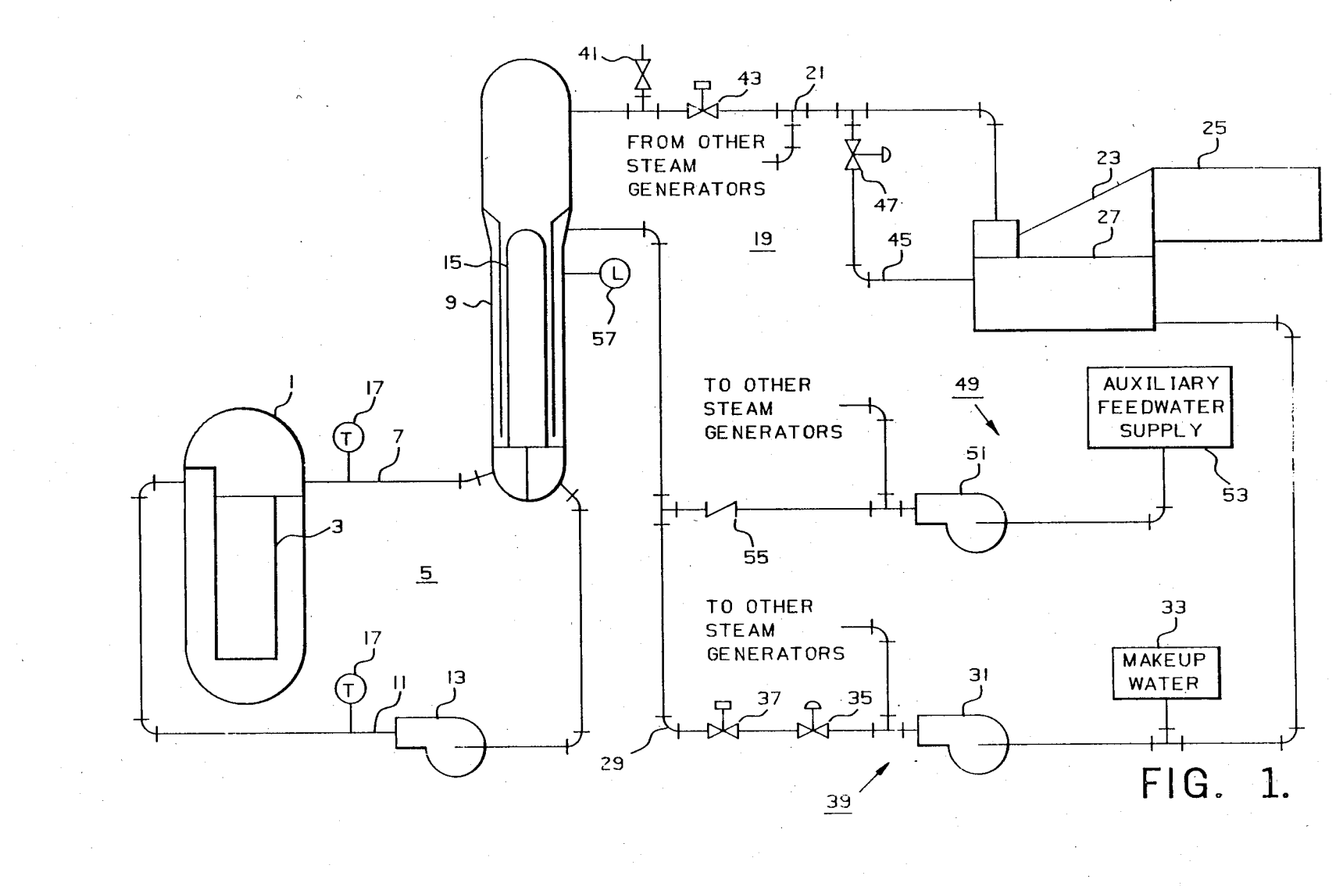
FIG. 1 is a schematic diagram of a PWR to which the invention is applied.

FIG. 1 illustrates schematically a pressurized water reactor (PWR) nuclear PWR plant to which the invention is applied. The PWR includes a nuclear reactor vessel 1 having a reactor core 3 in which controlled fission reactions produce heat. Reactor coolant in the form of light water is circulated in a primary loop 5, which includes the reactor core 3, a hot leg conduit 7, a steam generator 9, a cold leg conduit 11, and a reactor coolant pump 13. The coolant is circulated within the steam generator 9 through thousands of u-shaped tubes 15, immerged in water which is converted to steam by the heat carried by the reactor coolant. Temperature sensors 17 in the hot and cold leg 7 and 11 are used to generate an average coolant temperature, $T_{avg}$, which among other things, is used to control the power generated by the reactor.

Steam from the steam generator 9 circulates in a secondary loop 19 which includes a steam header 21 which conducts the steam to a steam turbine 23. The turbine 23 utilizes the steam to drive a generator 25 which produces electricity. Steam exhausted from the turbine is condensed in condenser 27 and the condensate is returned to the steam generator 9 as feedwater through a conduit 29 by a main feedwater pump 31, which together with a supply of make up water 33, an air operated control valve 35, and a motor operated main feedwater isolation valve 37, constitute the main feedwater system 39.

The steam header 21 includes a pressure relief valve 41 and a motor operated main steam isolation valve 43. A steam dump system includes a conduit 45 which diverts steam around the turbine to the condenser under the control of a compressed air driven steam dump valve 47. The steam dump system provides a means for dissipating excess heat such as in the event of a turbine trip, and the relief valve relieves excessive steam pressure.

In view of the importance of the secondary loop being able to absorb the heat generated by the reactor, a backup system for the main feedwater system is provided in the form of an auxiliary feedwater system 49 which includes an auxiliary feedwater pump 51 which pumps water from an auxiliary feedwater supply tank 53 through a check valve 55 into the feedwater conduit 29. The level of feedwater in the steam generator 9 is measured by a level measuring system 57 and typically feedwater flow in the main system is controlled to maintain the feedwater at a programmed level.

While FIG. 1 shows only one steam generator 9 for clarity, a typical power plant has one to four steam generators 9, each provided with heated coolant from the one reactor through its own primary loop, and all supplying steam to the one turbine-generator combination. The main feedwater system usually includes two main feedwater pumps 31 in parallel, either of which is sufficient to provide feedwater for all of the steam generators. Likewise, the auxiliary feedwater system 49 includes multiple pumps 51 in parallel which inject feedwater into the conduit 29 for each steam generator. Separate feedwater flow control valves 35, main feedwater isolation valves 37, and auxiliary feedwater check valves 55, as well as steam relief valves 41 and steam isolation valves 43, are provided for each steam generator. A single steam dump line 45 with valve 47 connected to the common portion of steam header 21 dumps steam for all of the steam generators.

Figures 2, 3:
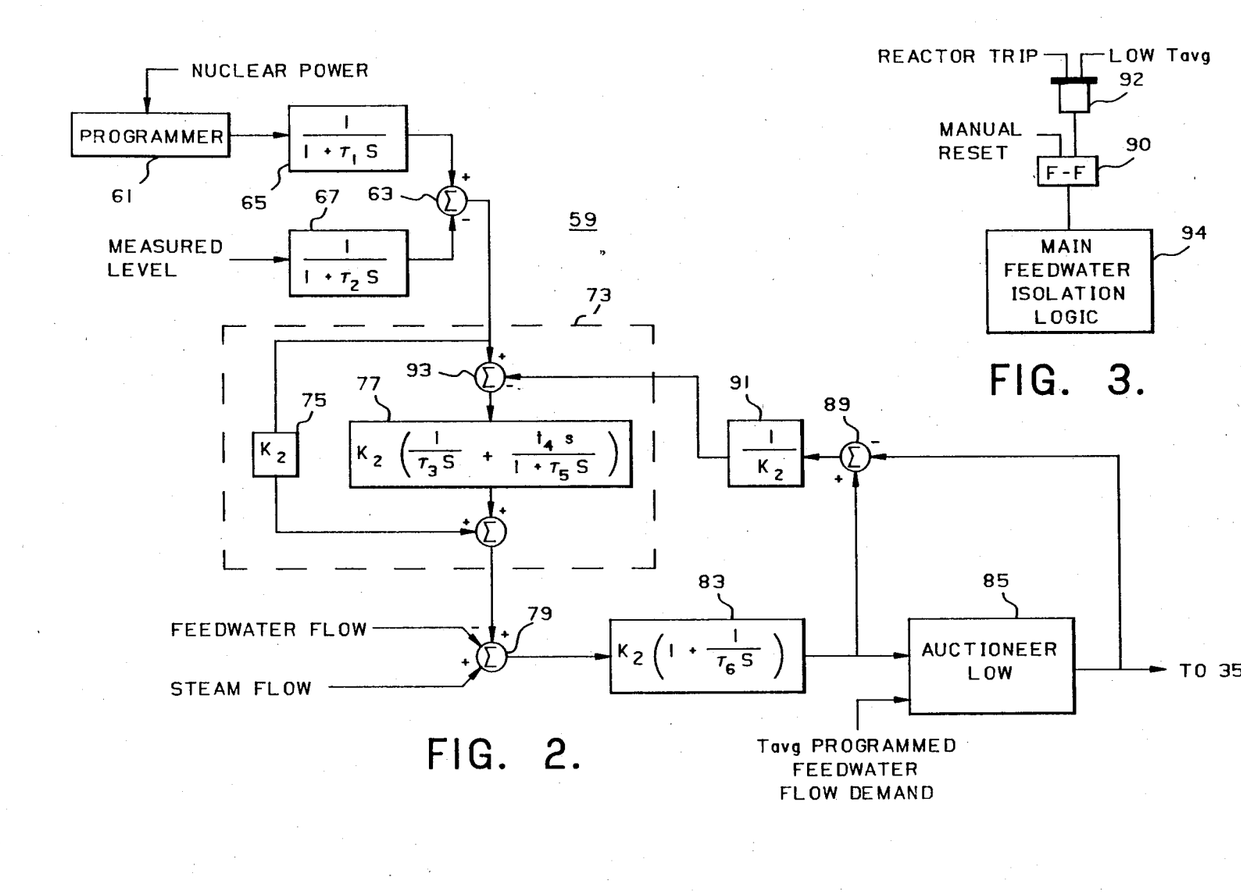
FIG. 2 is a schematic diagram of the main feedwater control for the PWR of FIG. 1.
FIG. 3 is a schematic diagram of a circuit for effecting isolation of the main feedwater system on Low $T_{avg}$ following a reactor trip.

Feedwater flow to each steam generator is controlled by a three element controller such as the controller 59 shown schematically in FIG. 2. The three elements of control are steam generator water level, feedwater flow and steam flow. A programmer 61 establishes a programmed level for the feedwater as a function of nuclear power which is a measure of the load imposed on the steam generator. The programmed level signal is compared in summer 63 with a signal representative of the actual feedwater level in the steam generator as measured by the measuring system 57 to generate a level error signal. The programmed level signal and the measured level signal are passed through lag units 65 and 67 respectively which reduce noise, and in the case of the programmed level signal, smoothes out changes in the set point due to changes in nuclear power.

The level error signal is applied to a PID controller 73 which applies proportional control action through block 75, and integral and derivative control action through block 77, to the applied signal. The feedwater level signal thus generated is combined in summer 79 with a feedwater flow signal, and a steam flow signal to generate a three element signal to which proportional and integral control action is applied in PI controller 83 to generate a feedwater flow control signal. This signal is compared with a control signal generated, in a manner to be discussed below, as a function of reactor coolant temperature in an Auctioneer Low unit 85 which selects the signal of smallest magnitude as the active control signal to modulate the feedwater control valve 35. The active control signal selected by the Auctioneer Low unit 85 is compared with the output from PI Controller 83 in a summer 89, with the difference multiplied by a proportionality factor in unit 91 and summed with the level error signal in the summer 93 in the PID controller 73.

The Auctioneer Low unit 85, summer 89, amplifier 91 and the associated connections, are new components added by the present invention, to be discussed below, to a conventional three element controller for the feedwater control valve 35. Such a controller regulates the flow of feedwater to the steam generator to maintain the steam generator feedwater inventory at the programmed level with dynamic compensation which takes into account any mismatch between steam flow and feedwater flow.

The scheme described above provides good control of the feedwater to the steam generator, but it is subject to conditions which can give rise to undesirable actuation of the auxiliary feedwater system. In the event a reactor trip followed by a turbine trip, the pressure rises in the steam generator. The interruption of steam flow also causes the steam voids, which typically account for about one-third of the water volume in the steam generator, to collapse, thereby rapidly lowering the water level. The increased pressure actuates the steam dump which reinitiates steaming to reestablish the voids and thereby raise the level somewhat. The dumping of steam however, leads to a low level signal which activates the main feedwater system. The cool feedwater supplied to the steam generator has the potential for lowering $T_{avg}$, the average temperature of the reactor coolant in the primary loops, to an extent which could reduce the shutdown margin of the reactor to an unacceptable extent as explained above. To prevent this from occurring, the main feedwater isolation valve 37 is closed when $T_{avg}$ is lowered to a preselected value. A circuit effecting this is shown in FIG. 3 wherein the simultaneous occurrence of a reactor trip signal and a Low $T_{avg}$ signal sets a flip-flop 90 through an AND gate 92. The flip-flop 90, which is reset manually, activates the main feedwater isolation logic 94 to close isolation valves 37. Termination of main feedwater flow, with continued operation of the steam dump, leads to a low-low level indication which automatically activates the auxiliary feedwater system. As previously mentioned, it is undesirable to unnecessarily challenge such a safety system. In addition, the auxiliary feedwater is colder and the system does not provide automatic control of the water level as the main feedwater system does, and therefore, can also potentially reduce the shutdown margin to an undesirable level.

Figure 4A:
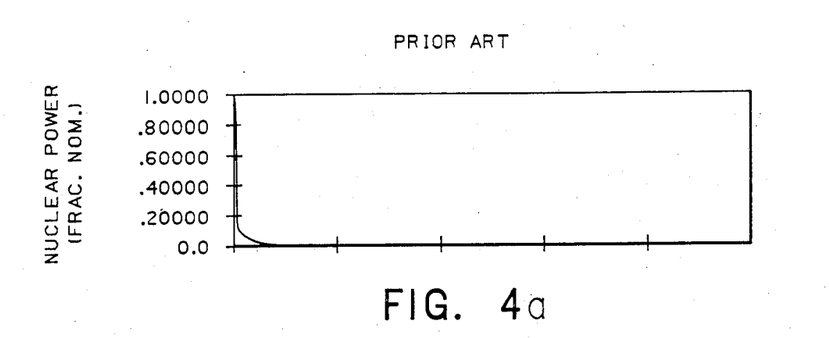
FIGS. 4a-f are diagrams illustrating the effect of a reactor trip on selected parameters in a PWR not incorporating the present invention.
Figure 4B:
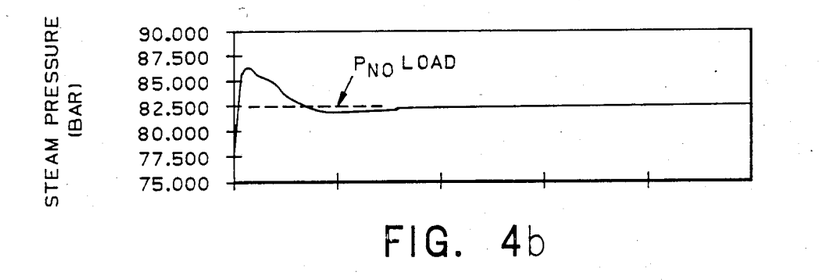
Figure 4C:
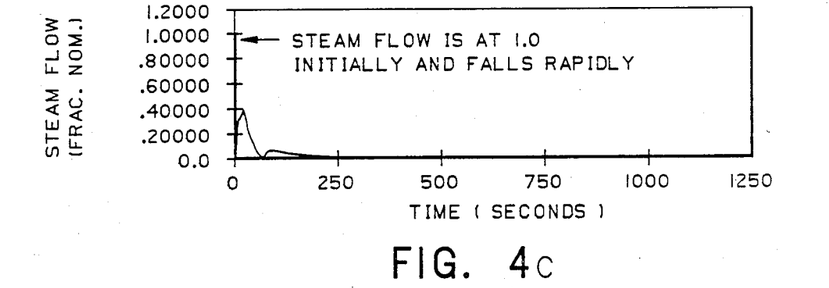
Figure 4D:
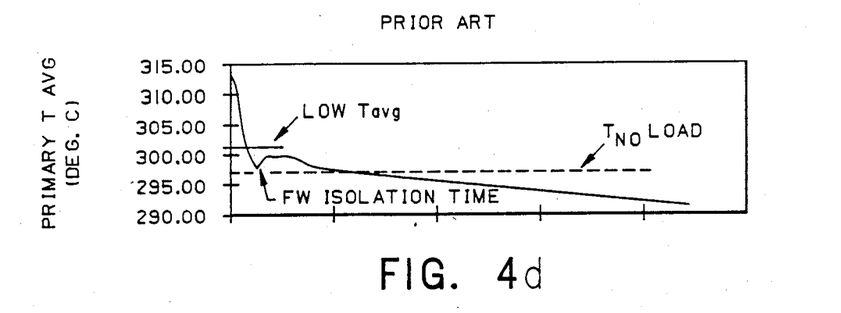
Figure 4E:
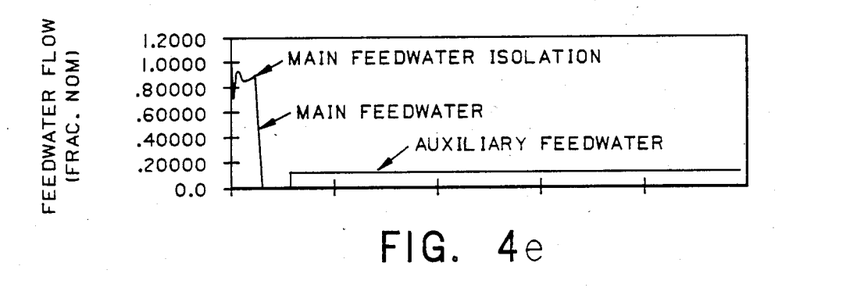
Figure 4F:
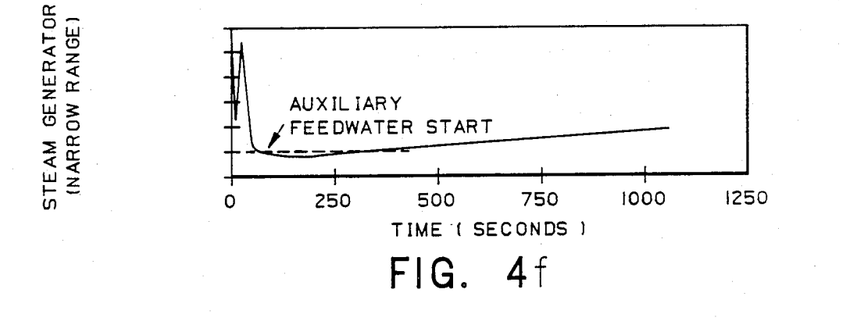

The effect of the above described scenario, that is, a reactor trip followed by a turbine trip which leads to actuation of the auxiliary feedwater system, on the key system parameters in a PWR at full power, which does not incorporate the invention, is illustrated in FIGS. 4a-f. As seen by FIG. 4a the nuclear power initially drops rapidly and then more slowly falls to zero power. FIG. 4b illustrates that the steam pressure rises rapidly when the turbine trips and steam flow is terminated, until the steam dump opens and the pressure falls to the no load pressure. Steam flow, as shown in FIG. 4c, falls from a nominal fractional value of 1.0 at a full power to zero when the turbine trips, rises as the dump system takes effect, and then falls off to zero. FIG. 4d shows that $T_{avg}$ of the reactor coolant falls below the Low $T_{avg}$ set point which results in isolation of the main feedwater system. $T_{avg}$ then increases somewhat before gradually falling off below the no load value. The feedwater flow, as indicated by FIG. 4e, drops initially due to a mismatch with steam flow which is terminated by shut down of the turbine, increases with activation of the steam dump, and then is cut to zero with the closing of the main feedwater isolation valves as a result of the drop in $T_{avg}$. FIG. 4f illustrate the effect of this transient on steam generator level. The level drops with the collapse of the voids when steam flow ceases upon tripping of the turbine, recovers to some extent initially with activation of the steam dump and then falls rapidly when the main feedwater isolation valve closes until the low-low limit is reached and the auxiliary feedwater system is activated to raise the level again.

We have determined that in order to avoid auxiliary feedwater operation, the main feedwater system must be kept in operation after reactor trip while avoiding a primary coolant excessive cool down. This is achieved by the following:

A. The low primary $t_{avg}$ set point, which triggers isolation of the main feedwater system, is lowered to a value below the no load temperature. It will be noticed from FIG. 4d that in the conventional feedwater control system, the Low $T_{avg}$ set point is above the no load temperature. As this function is not used in any accident analysis, lowering the set point does not require any reanalysis. The only verification to be performed is to assure that the design transient "reactor trip without inadvertent cooldown" is not exceeded, or to assess the acceptability of small deviations. Lowering of the $T_{avg}$ set point below the no load temperature will avoid main feedwater isolation when going from full load to no load conditions.

B. The low-low steam generator level reactor trip set point is assumed to be lowered to a value below the initial dip in level caused by the termination of steam flow. In order to gain the maximum margin on auxiliary feedwater start on low-low steam generator level, it can be necessary, depending upon plant, and more importantly, steam generator design to:
(a) lower the low-low level set point;
(b) filter the level signal to reduce the magnitude of the transient;
(c) delay the auxiliary feedwater start by a time interval which will allow the level to recover from the critical dip caused by termination of steam flow;
(d) start the auxiliary feedwater system on a wide range signal (normally the low-low level signal is generated by narrow range instrumentation which provides accurate measurement but only in the expected range of steam generator level. In some steam generator designs, the lowered set point may be out of the range of the narrow range instrumentation and the wide range signal may have to be used);
(e) demonstrate acceptability of the above by appropriate accident reanalysis:
(f) upon detection of a reactor trip, overriding the high feedwater flow demand induced by the low steam generator level with a flow demand program based upon primary temperature measurement.

Figure 5:
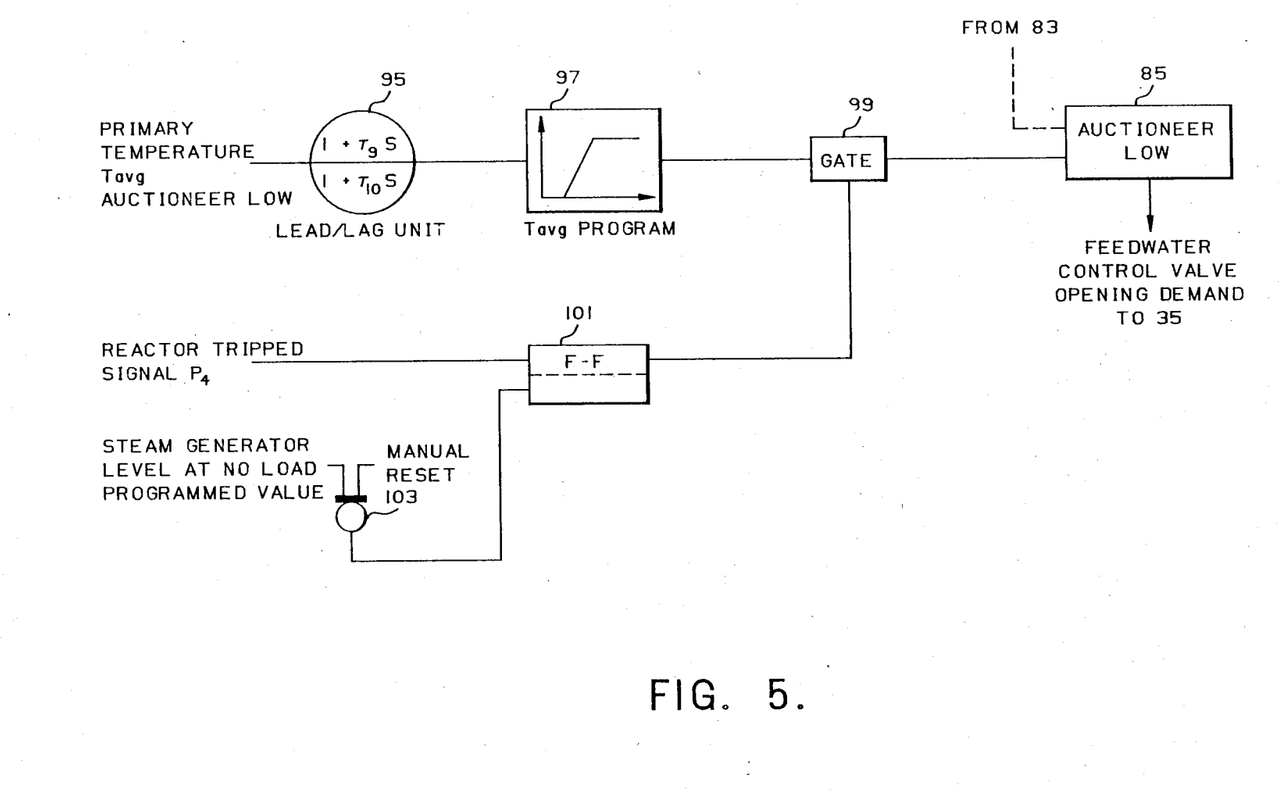
FIG. 5 is a schematic diagram of a modification to the main feedwater flow control system of FIG. 2 for generating a primary coolant programmed flow control signal following a reactor trip.

Excessive cooldown, as well as a steam generator low-low level signal, are avoided by the additions to the feedwater control system shown in FIG. 5. The $T_{avg}$ signals for each of the primary loops generated from the temperature sensors 17 are auctioneered low with the lowest signal selected. Dynamic compensation is applied to the selected $T_{avg}$ signal by lead-lag unit 95 to speed up the response.

Figure 6:
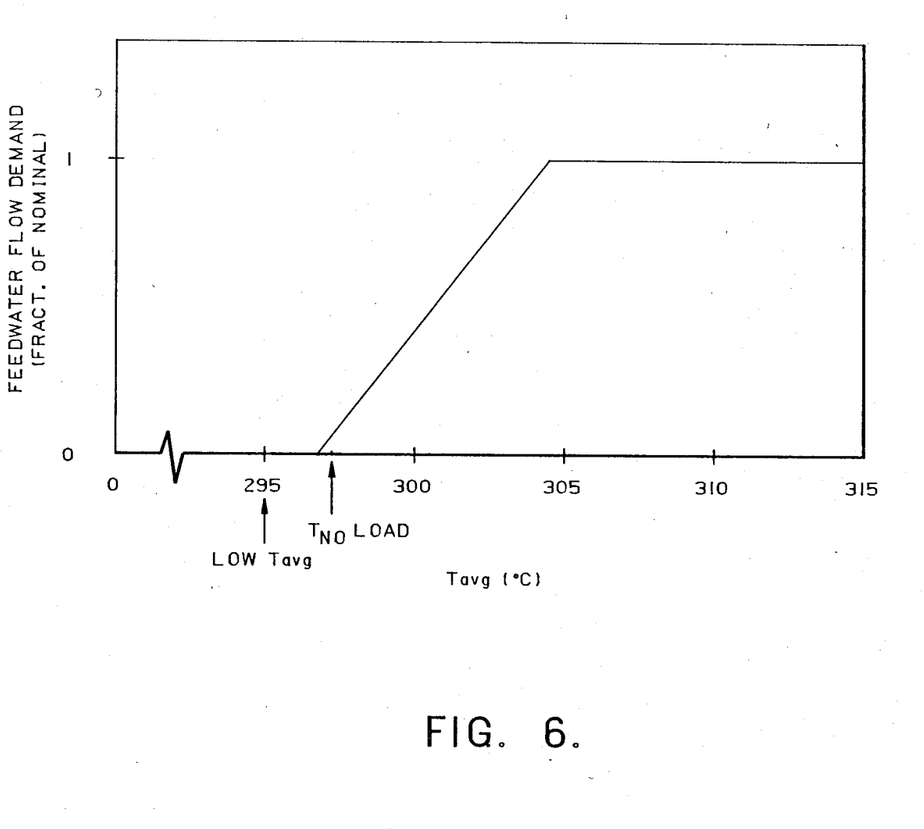
FIG. 6 is a diagram of a suitable primary coolant, $T_{avg}$, flow control program in accordance with the invention for use in the modification to the main feedwater flow control system shown in FIG. 5.

The compensated $T_{avg}$ signal is then utilized to generate a $T_{avg}$ programmed feedwater flow control signal in programmer 97. An exemplary program is illustrated in FIG. 6. This program is selected such that:
(a) the steam dump flow does not deplete steam generator inventory to the extent that the low-low level is reached;
(b) feedwater flow is gradually reduced as no load temperature is reached.
(c) feedwater flow is interrupted (in control mode) slightly below no load temperature and before the new low primary temperature set point is reached;
(d) the feedwater flow demand at no load exceeds decay heat level at the time this temperature is reached.

Returning to FIG. 5, application of this $T_{avg}$ programmed flow control signal to the Auctioneer Low unit 85 of FIG. 2 is controlled by an analog gate 99. The gate 99 is controlled by a flip-flop 101 which is set by a reactor trip signal. A reactor trip sets the flip-flop 101 to turn on analog gate 99 to apply the $T_{avg}$ programmed flow control signal to the Auctioneer Low unit 85 which selects the smaller of this signal and the conventional, level programmed flow control signal for positioning the main feedwater control valve 35. As the primary temperature goes down, the $T_{avg}$ programmed flow control signal will be lower in magnitude and will thus be selected to control main feedwater flow. Hence, the Auctioneer Unit 85 permits the steam generator level to recover slowly in the automatic mode without excessive cooldown.

Once set by a reactor trip signal, the flip-flop 101 keeps the analog gate 99 turned on in order to allow resetting the reactor trip breakers and a quick restart if plant conditions permit. With this arrangement, no operator action is required to control steam generator level and primary temperature while the restart is being attempted. The flip-flop 101 can be reset through an OR gate 103 by a manual signal or automatically when the steam generator level is at the programmed value. In the latter case, the feedwater flow demand is zero and there is no risk of plant undercooling. With the flip-flop reset, the analog gate applies a high level signal to the Auctioneer Low Unit 85 so that the conventional flow control signal is selected as the active signal.

When the primary temperature program loop is active and is actually limiting the feedwater flow, the feedwater control loop is open and the steam generator level control system will eventually integrate the steam generator level error signal to a full open demand. As a result, the Auctioneer Low Unit 85 will select the signal from the primary temperature, $T_{avg}$, program loop even when the no load steam generator level has been reestablished, thereby producing a steam generator overfilled condition. Moreover, when the reactor trip breakers are reset, and the limited $T_{avg}$ programmed flow control signal is cut off by the analog switch and replaced by a high level signal, there will be a step demand when the Auctioneer Low Unit switches back to the level programmed flow control signal which has been integrated up to the full demand level.

To avoid these problems, the steam generator level control system integral and derivative terms are slaved to the primary temperature, $T_{avg}$, loop signal whenever the $T_{avg}$ programmed flow control signal is active and its demand is below the proportional value opening demand from the steam generator level control system.

This is accomplished in the system shown in FIG. 2 by the feedback provided from the output of the Auctioneer Low Unit 85. This signal is compared with the level programmed flow control signal appearing at the output of PI controller 83. When the Auctioneer Low Unit 85 selects the level programmed signal, there is no feedback since the two signals applied to the summer 89 are the same. With the $T_{avg}$ programmed signal selected, the feedback forces the level programmed signal to track the $T_{avg}$ programmed signal. With this arrangement, when the reactor trip breakers are reset or when steam generator level reaches the programmed value, and the system reverts to level control, the feedwater flow demand will initially remain the same; and will thereafter be corrected in accordance with the level program as required. Thus, a bumpless transfer is effected between the two programs. Techniques for effecting bumpless transfer between two control signals are known and can be accomplished by other arrangements than the preferred form shown in FIG. 2.

Figure 7:
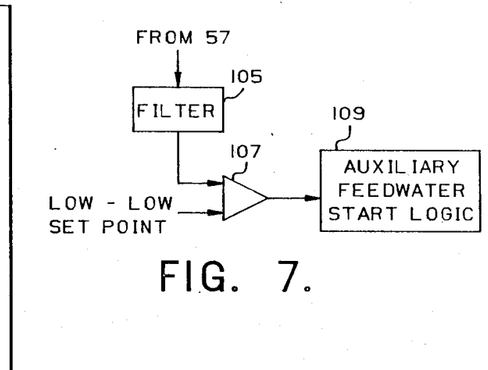
FIGS. 7 and 8 are schematic diagrams of circuits in accordance with the invention for preventing startup of the auxiliary feedwater system on the initial dip in steam generator level following a reactor trip.

A suitable circuit for avoiding startup of the auxiliary feedwater system on a low-low level signal generated by the initial dip in level by filtering the level signal, as prescribed by item B(b) above, is illustrated in FIG. 7. As shown, the level signal generated by the level measuring system 57 is applied to a low pass filter 105 which has a bandwidth below the frequency of the dip in level resulting from momentary interruption in steam flow following a reactor trip. A comparator 107 compares the filtered level signal with the low-low set point signal to generate a signal which activates an auxiliary feedwater start logic circuit 109 to turn on the auxiliary feedwater pumps 51 when the filtered level falls below the set point value.

Figure 8:
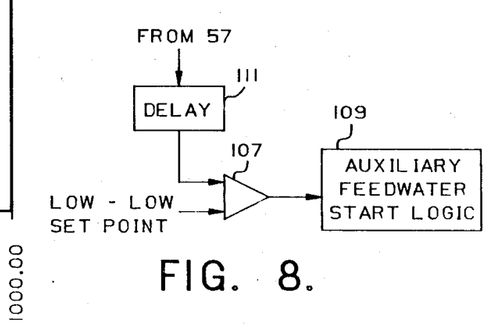

As shown in FIG. 8, the level signal from the steam generator level measuring system 57 can be alternately delayed by a delay circuit 111 as suggested in paragraph B(c) above for an interval which permits the level to recover from the initial dip following reactor trip. The delay circuit 111 in effect only exhibits a change in output when the change in input persists for the preselected interval of time. As in the case of the filtered level signal, the delayed signal is compared in a comparator 107 with the low-low set point to actuate the auxiliary feedwater start logic 109 when the level falls below the set point value for the prescribed time period. The level signal may be both filtered and delayed where necessary to prevent auxiliary feedwater start-up on the initial dip following a reactor trip; however, careful analysis is required to assume that adequate protection is provided.

Figure 9:
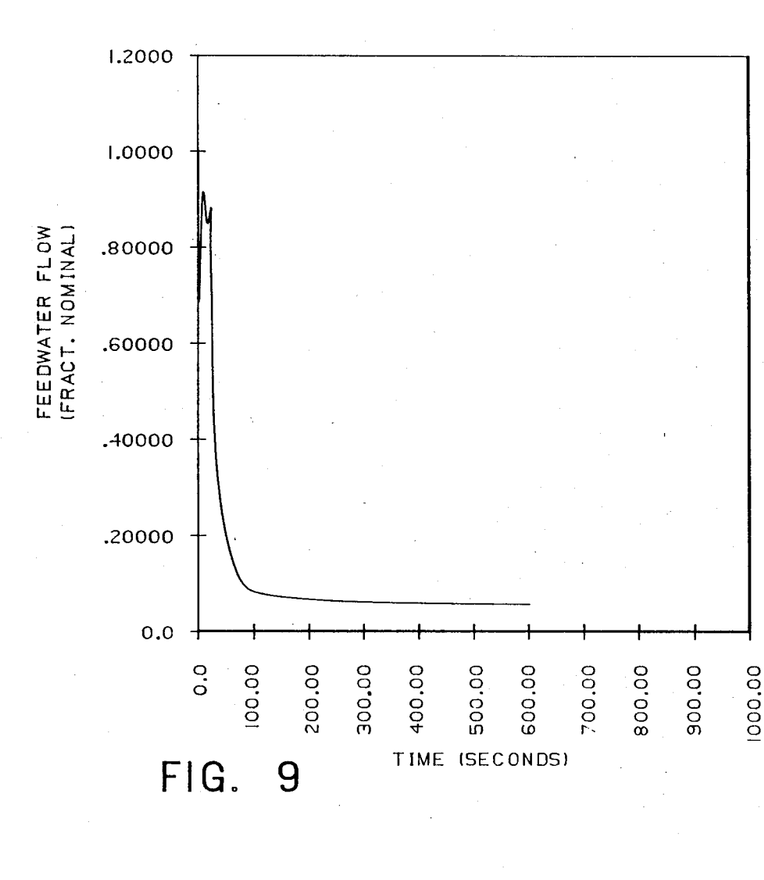
FIGS. 9, 10, and 11 are plots of main feedwater flow, $T_{avg}$ and steam generator level respectively as a function of time following a reactor trip for an exemplary PWR incorporating the invention.
Figure 10:
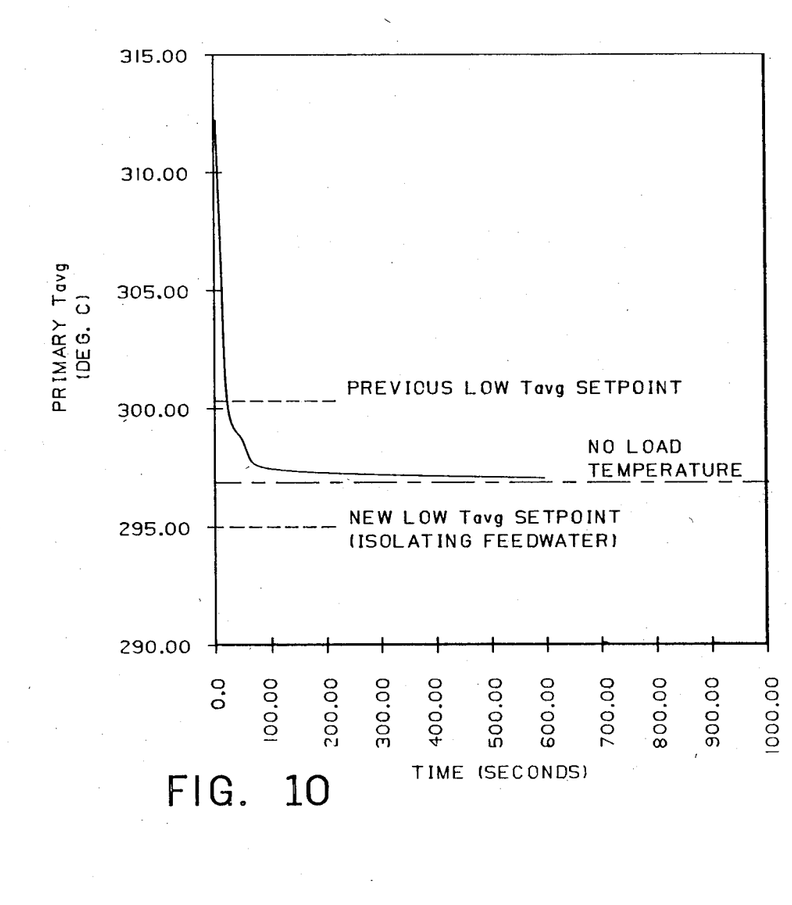
Figure 11:
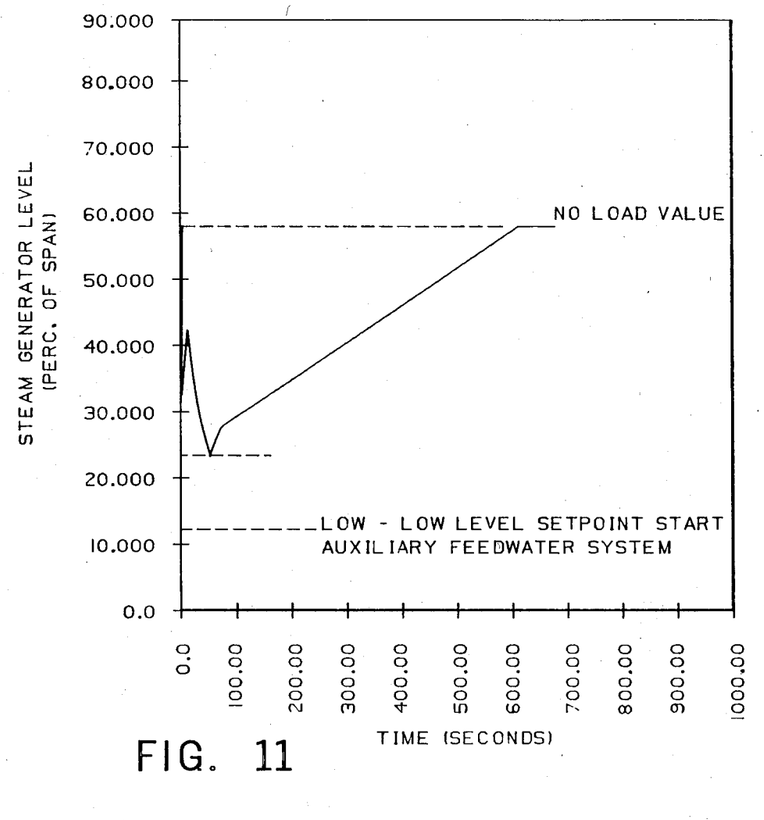

A reactor trip from full power with the invention is illustrated by FIGS. 9 through 11. As shown in FIG. 9, feedwater flow drops rapidly following the trip as steamflow is terminated by the turbine trip, and then increases rapidly in response to the collapse of the voids and resultant sudden decrease in level. After the steam dump opens and the level recovers to some extent, another dip occurs in the flow, and then under the $T_{avg}$ program, the flow steadily decreases until an equilibrium flow for the decay heat is reached. FIG. 10 plots primary $T_{avg}$, which as can be seen, falls rapidly, passing through the previous Low $T_{avg}$ set point, which would have isolated the main feedwater system, before decreasing more slowly and leveling off at the no load temperature. With the invention, $T_{avg}$ does not threaten the new Low $T_{avg}$ set point. FIG. 11 illustrates steam generator level following the reactor trip. The level falls rapidly from about 58% of nominal value at the time of the trip due to collapse of the voids, recovers to about 42% when the steam dump opens and steam flow is reestablished, and then falls as steam is dumped before the feedwater flow exceeds the steam losses and the level slowly climbs to the no load value of about 60%. As can be seen from the plot, a comfortable margin is maintained between the minimum level reached of about 23% nominal and the low-low level set point of about 12% at which the auxiliary feedwater system is started. The steam generator level characteristic is plant specific, but the plot shown is typical. If the low-low level set point can not be lowered sufficiently for safety reasons, other steps mentioned above may be adequate to avoid actuating the auxiliary feedwater system such as delaying, if possible, the actuation so that the level has an opportunity to recover from a momentary dip.

With the present invention, excessive primary cooldown and starting of the auxiliary feedwater system following a reactor trip are avoided.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of operating a PWR comprising the steps of:

generating a main feedwater flow control signal as a function of steam generator level;

generating an alternative main feedwater flow control signal as a function of reactor coolant $T_{avg}$;

controlling main feedwater flow with the flow control signal generated as a function of steam generator level with the PWR at power; and controlling main feedwater flow with the alternate flow control signal generated as a function of $T_{avg}$ following a reactor trip in a manner which avoids isolating main feedwater flow and activating an auxiliary feedwater system.

2. The method of claim 1 wherein the step of generating a flow control signal as a function of reactor coolant $T_{avg}$ comprises generating a signal which decreases with decreasing $T_{avg}$ and terminates flow at a $T_{avg}$ which is above a selected Low $T_{avg}$ value at which the main feedwater system is isolated.

3. The method of claim 1 wherein the step of generating a main feedwater flow control signal as a function of steam generator level includes applying integral control action thereto, said method including the additional steps of transferring control back to control of main feedwater flow with said signal generated as a function of steam generator level when said steam generator level reaches a predetermined level with flow controlled with said alternate flow control signal, and slaving the signal generated as a function of steam generator level to the alternate signal while said latter signal is being used to control main feedwater flow, whereby a bumpless transfer is effected upon transfer from said alternate signal to the signal generated as a function of steam generator level.

4. In a method of controlling the flow of feedwater to a steam generator in a pressurized water reactor comprising the steps of:
monitoring steam generator level;
controlling feedwater flow to the steam generator from a main feedwater system as a programmed function of water level;
monitoring reactor coolant $T_{avg}$, isolating the main feedwater system when $T_{avg}$ falls to a Low $T_{avg}$ set point value, and actuating an auxiliary feedwater system when the steam generator level falls to a low low level set point level;
the improvement comprising:
monitoring reactor operation for a reactor trip and in response thereto;
terminating control of feedwater flow as a programmed function of steam generator level; and instead,
controlling the flow of feedwater to the steam generator from the main feedwater system as a programmed function of $T_{avg}$ in a manner which avoids isolating the main feedwater system and activating the auxiliary feedwater system.

5. The method of claim 1 wherein the step of controlling the flow of feedwater to the steam generator from the main feedwater system as a programmed function of $T_{avg}$ comprises reducing the flow with decreasing $T_{avg}$ below a preselected value of $T_{avg}$ and terminating flow at a value of $T_{avg}$ which is above said Low $T_{avg}$ set point.

6. The method of claim 5 including the step of reducing the Low $T_{avg}$ set point to a value which is below a preselected no load $T_{avg}$ value.

7. The method of claim 6 wherein the step of terminating flow at a value of $T_{avg}$ which is above said Low $T_{avg}$ set point includes selecting a value of $T_{avg}$ for termination of flow which is below the preselected no load $T_{avg}$ value.

8. The method of claim 5 including the step of:
maintaining control of feedwater flow as a programmed function of $T_{avg}$ while attempting to restart the tripped reactor, and following restart, continuing control of feedwater flow as a programmed function of $T_{avg}$ until the steam generator level reaches a predetermined level, and transferring back to controlling main feedwater flow as a programmed function of steam generator level when said predetermined steam generator level is reached.

9. The method of claim 8 wherein said predetermined steam generator level is a preselected no load level.

10. The method of claim 5 including the step of lowering the low-low level set point below the lowest level reached by a dip in steam generator level when steam flow is terminated following a reactor trip and before a steam dump system is activated to reestablish steam flow, in order to avoid actuation of said auxiliary feedwater system on said dip.

11. The method of claim 5 wherein the step of monitoring steam generator level includes providing a level signal filtered to prevent a dip in steam generator level from reaching the low-low level set point when steam flow is terminated following a reactor trip and before a steam dump system is activated to reestablish steam flow, to avoid activating the auxiliary feedwater system on said dip.

12. The method of claim 5 including the step of delaying activating of the auxiliary feedwater system on a low-low level signal for an interval following a reactor trip sufficient in duration to allow the steam generator level to recover from an initial dip in level resulting from termination of steam flow through reestablishment of steam flow by operation of a steam dump.

13. Apparatus comprising;
a steam generator;
a main feedwater system for supplying feedwater to the steam generator;
a reactor which heats reactor coolant for circulatin through the steam generator to convert the feedwater to steam;
means for monitoring reactor coolant temperature and determining a $T_{avg}$;
means responsive to reactor coolant $T_{avg}$ for isolating the main feedwater system from the steam generator when reactor coolant temperature decreases to a selected Low $T_{avg}$ set poit value;
an auxiliary feedwater system;
means for monitoring steam generator level;
means responsive to steam generator level for activating said auxiliary feedwater system when steam generator level decreases to a low-low level set point value; and
flow control means for controlling flow of feedwater from the main feedwater system to the steam generator as a programmed function of the monitored steam generator level and responsive to a reactor trip for controlling main feedwater flow instead as a programmed function of reactor coolant $T_{avg}$ which function decreases flow as $T_{avg}$ decreases, and terminates flow before $T_{avg}$ decreases to the Low $T_{avg}$ set point value, whereby activation of the main feedwater system isolation means and of the auxiliary feedwater system are avoided.

14. The apparatus of claim 13 wherein said flow control includes means for generating a flow control signal programmed as a function of steam generator level, means for generating a flow control signal programmed as a function of reactor coolant $T_{avg}$, and means responsive to a reactor trip for comparing the level programmed and $T_{avg}$ programmed flow control signal and for controlling flow with the programmed signal having the lowest magnitude.

15. The apparatus of claim 13 wherein said means for monitoring steam generator level generates a steam generator level signal and wherein said means for activating the auxiliary feedwater system includes means for comparing the level signal with a low-low set point signal and for activating the auxiliary feedwater system when the level signal falls to the value of the set point signal, and further including means for delaying the level signal for a duration which exceeds the duration of an initial dip in steam generator level following the reactor trip.

16. The apparatus of claim 13 wherein said means for monitoring steam generator level generates a steam generator level signal and wherein said means for activating the auxiliary feedwater system includes means for comparing the steam generator level signal with a low-low set point signal and for activating the auxiliary feedwater system when the level signal, falls to the value of the low-low set point signal, and further including means for filtering the steam generator level signal such that it does not fall to the value of the set point signal in response to an initial dip in steam generator flow following a reactor trip resulting from the termination of steam flow and before steam flow is reestablished by the dumping of steam.

* * * * *